(12) United States Patent
Zhang et al.

(10) Patent No.: US 6,925,120 B2
(45) Date of Patent: Aug. 2, 2005

(54) TRANSCODER FOR SCALABLE MULTI-LAYER CONSTANT QUALITY VIDEO BITSTREAMS

(75) Inventors: Ximin Zhang, Harrison, NJ (US); Anthony Vetro, Staten Island, NY (US); Yun-Qing Shi, Millburn, NJ (US); Huifang Sun, Cranbury, NJ (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 524 days.

(21) Appl. No.: 09/961,987

(22) Filed: Sep. 24, 2001

(65) Prior Publication Data

US 2003/0058931 A1 Mar. 27, 2003

(51) Int. Cl.[7] .................................................. H04N 7/12
(52) U.S. Cl. ................................................. 375/240.08
(58) Field of Search ................. 375/240.08, 240.01, 375/240.12–240.16, 240.24, 240.25; 348/42; 370/535; 380/37

(56) References Cited

U.S. PATENT DOCUMENTS

| | | | |
|---|---|---|---|
| 5,978,029 A | | 11/1999 | Boice et al. ................ 348/412 |
| 6,043,838 A | * | 3/2000 | Chen .......................... 348/42 |
| 6,085,221 A | | 7/2000 | Graf ........................... 709/202 |
| 6,167,084 A | | 12/2000 | Wang et al. ............ 375/240.02 |
| 6,198,878 B1 | | 3/2001 | Blawat et al. .............. 386/111 |
| 6,205,174 B1 | | 3/2001 | Fert et al. ............... 375/240.03 |
| 6,233,017 B1 | * | 5/2001 | Chaddha ................ 375/240.12 |
| 6,263,022 B1 | | 7/2001 | Chen et al. ............ 375/240.03 |
| 6,480,541 B1 | * | 11/2002 | Girod et al. ........... 375/240.12 |
| 6,553,072 B1 | * | 4/2003 | Chiang et al. ......... 375/240.25 |
| 6,567,427 B1 | * | 5/2003 | Suzuki et al. ............... 370/535 |
| 2002/0076043 A1 | * | 6/2002 | Van Der Vleuten et al. .. 380/37 |
| 2002/0118743 A1 | * | 8/2002 | Jiang ..................... 375/240.01 |

OTHER PUBLICATIONS

Hayder Radha and Yingwei Chen, "*Fine–Granular–Scalable Video for Packet Networks*", Philips Research.
Hayder Radha, "*Fine–Granular–Scalability (FGS)*".
C. Valens, "*EZW encoding*", 1999.

* cited by examiner

*Primary Examiner*—Richard Lee
(74) *Attorney, Agent, or Firm*—Dirk Brinkman; Andrew J. Curtin

(57) ABSTRACT

A method codes an output bitstream of an input video so the decoded output bitstream has a constant perceived quality. A base layer bitstream having a constant bit-rate is generated from the input video, and an input enhancement layer bitstream is generated from a difference between the input video and the base layer bitstream. Rate and distortion characteristics are extracted from the base layer bitstream and the input enhancement layer bitstream, and an output enhancement layer bitstream having a variable bit-rate is generated from the input enhancement layer bitstream according to the rate and distortion characteristics. The base layer bitstream and the output enhancement layer bitstream, in combination, form an output bitstream having a variable bit-rate and a constant distortion.

21 Claims, 11 Drawing Sheets

TRANSCODER FOR SCALABLE MULTI-LAYER CONSTANT QUALITY VIDEO BITSTREAMS

FIELD OF THE INVENTION

The present invention is generally related to the field of transcoding videos, and more particularly to transcoding scalable video data.

BACKGROUND OF THE INVENTION

Video compression enables storing, transmitting, and processing of visual information with fewer storage, network, and processor resources. The most widely used video compression standards include MPEG-1 for storage and retrieval of moving pictures, MPEG-2 for digital television, and H.263 for video conferencing, see ISO/IEC 11172-2:1993, "Information Technology—Coding of Moving Pictures and Associated Audio for Digital Storage Media up to about 1.5 Mbit/s—Part 2: Video," D. LeGall, "MPEG: A Video Compression Standard for Multimedia Applications," Communications of the ACM, Vol. 34, No. 4, pp. 46–58, 1991, ISO/IEC 13818-2:1996, "Information Technology—Generic Coding of Moving Pictures and Associated Audio Information—Part 2: Video," 1994, ITU-T SG XV, DRAFT H.263, "Video Coding for Low Bitrate Communication," 1996, and ITU-T SG XVI, DRAFT13 H.263+Q15-A-60 rev.0, "Video Coding for Low Bitrate Communication," 1997.

These standards are relatively low-level specifications that deal primarily with spatial compression of images or frames, and the spatial and temporal compression of a sequence of frames. As a common feature, these standards perform compression on a per frame basis. The standards achieve high compression ratios for a wide range of applications.

For transmission of a video over a communications channel with a fixed bandwidth, the video is often encoded with a constant bit-rate (CBR). To account for minor fluctuations in the bits produced for each frame, output bits of an encoder are first sent to a storage buffer. Subsequently, the buffer releases the output bits at a constant bit-rate to the channel.

There are many advantages with a CBR coded video, however, CBR encoding also has certain drawbacks. One drawback is that the perceived picture quality fluctuates due to fluctuating distortion within the bitstream. As distortion increases, the perceived quality of a picture decreases. As another drawback, CBR encoding does not provide an efficient means of transmitting a video over time-varying heterogeneous networks. Such a network is characterized by either varying bandwidth or sessions that are established based on available bit-rate (ABR) among many users or a combination of the two. In both cases, either to provide constant or a maximum quality video, or to fully utilize the capacity of the communications channel, variable bit-rate (VBR) encoding is often considered.

In U.S. Pat. No. 6,198,878, "Method and apparatus for encoding and decoding digital video data," issued on Mar. 6, 2001 to Blawat et al., a buffer control strategy for VBR coded video stored on a fixed capacity medium was described. Blawat et al. increased quality in a first part of the entire sequence, e.g., 80% of total playing time, while maintaining a negligible loss in quality for a second part of the sequence, e.g., 20% of total playing time. Although a VBR coded video was produced, no method was described which would guarantee constant quality. Rather, their focus was on minimizing the distortion in the reconstructed video.

In U.S. Pat. No. 6,205,174, "Variable bit-rate video coding method and corresponding video coder," issued on Mar. 20, 2001 to Fert et al., a VBR video coding method that includes an analysis pass, a prediction pass, and picture re-arrangement was described. They improved over previous VBR coders in that data from the first pass impacted the final quantization step size, as well as the location of picture types, i.e., I, P and B-frames, which was referred to as group of frames (GOP) allocation. They required multiple iterations to achieve reasonably constant quality, and indicated that a larger number of iterations would further improve the quality. However, each iteration consumed additional processing power and increased delay.

U.S. Pat. No. 5,978,029, "Real-time encoding of video sequence employing two encoders and statistical analysis," issued on Nov. 2, 1999 to Boice, et al., described an encoding sub-system for analyzing a sequence of video frames and for deriving information. The sub-system includes a control processor for analyzing gathered information and for producing a set of control parameters. A second encoding sub-system encoded each frame using a corresponding set of control parameters. They overcame the delay associated with many prior VBR encoders by gathering statistics in a first pass, and then using the statistics to perform the encoding in a second pass. Although, in principle, the encoder system described was not very different from prior multi-pass encoders, they did described the means by which the two encoders could be coupled to ensure real-time operation.

In summary, the prior art methods primarily describe VBR coders that minimize distortion when fluctuations in the bit-rate is not a major concern.

It is evident from the prior art that extracting data from coded bitstreams during a first stage, and using the extracted data in a second stage of encoding is a common technique. That is further described by Lin et al. in "Bit-rate control using piece-wise approximated rate-distortion characteristics," IEEE Trans. Circuits and Systems for Video Technology, August 1998. They describe a large set of quantization scales to encode a video. Corresponding rate-quantizer data and distortion-quantizer data were also recorded. Using that recorded data, a curve was interpolated via linear or cubic interpolation methods. The curve was finally used to select a set of quantization scales that minimized the average distortion or distortion variation for a given rate constraint. However, their method is computationally expensive in calculating the rate-quantizer data, and furthermore, a complex search for the optimal quantization scales are needed. Consequently, this method cannot be used for real-time applications, particularly, for low bit-rate streaming data.

FIG. 1 shows he underlying concept of most prior art VBR encoders. In one branch of an encoder 100, source-coding statistics 111 are extracted from the input video 101 by a statistics generator 110. A special case of the statistics generator 110 is a video encoder that extracts actual rate-distortion (R-D) statistics 111, possibly from many rate-distortion samples using a large set of quantization parameters. The R-D statistics 111 are sent to a statistical analyzer 120 where R-D parameters 121 for coding are determined. The R-D parameters 121 are used to perform single-layer VBR coding 130 on a copy of the input video 101 that has been delayed 140. The result is a VBR coded bitstream 150 that can be stored or transmitted over a network.

FIG. 2 shows a statistical multiplexing application of VBR coding as described in U.S. Pat. No. 6,167,084, "Dynamic bit-allocation for statistical multiplexing of compressed and uncompressed digital video signals," issued on Dec. 26, 2000 to Wang et al. A dynamic bit-allocation method 200 allocates rates to multiple programs 201 transmitted over a CBR channel 262. Each program (video) 201 is encoded 210 in the form of either a compressed or uncompressed bitstream, possibly stored on a disk 220.

Hierarchical dynamic bit-allocation is performed using a rate control processor 240. The rate control processor first allocates bits at a super group-of-frames (GOP) level, then ultimately down to the frame level. The rate control processor 240 uses rate-distortion parameters 241 that are extracted by multiple single-layer VBR transcoders 231–232 and encoders 233–234. A target number of bits is determined in the rate control processor 240 according to frame types and program priority. Constraints on the target bit-rates are also considered in the rate control processor to prevent overflow and underflow in a buffer 260. Therefore, a signal on line 261 indicate the "fullness" of the buffer 260. The target number of bits for each video program is sent to each of the multiple encoders to produce multiple single-layer VBR bitstreams 235–238. Those bitstreams are multiplexed 250, buffered 260 and typically transmitted over the CBR channel 262.

For video transmission, e.g., from a video server to receivers, e.g. televisions or computers, external bandwidth fluctuation is a major concern. The fluctuation not only impacts the quality, but it also affects delay and jitter during transmission. U.S. Pat. No. 6,085,221, *"File server for multimedia file distribution,"* issued on Jul. 4, 2000 to Graf described a method for transmitting multimedia files from file servers. VBR coders were used to compress the multimedia. Graf did not elaborate on the details of his VBR encoding. He simply assumed that constant perceived quality could be achieved irrespective of the coding format. However, he does describe a method of scheduling a video transmission. Also, there was no mention of methods that could be used to optimize the perceived quality of the reconstructed video.

For the most part, the methods described above have two implicit assumptions. First, a single layer encoding scheme was assumed, and second there was a limited set of parameters that could be adjusted to meet rate or distortion constraints, e.g., for MPEG-2, only quantization parameters and GOP structures, i.e., frame type and location, are considered.

Video coding standards, such as MPEG-4 for multimedia applications, see ISO/IEC 14496-2:1999, *"Information technology—coding of audio/visual objects, Part 2: Visual,"* provide several new coding tools, including tools to improve the coding efficiency, and tools that support object-based coding and error-resilience.

One of the main problems in delivering video content over networks is adapting the content to meet particular constraints imposed by users and networks. Users require playback with minimal variation in perceived quality. However, dynamic network conditions often make this difficult to achieve.

Fine granular scalable (FGS) coding has been adopted by the MPEG-4 standard. The tools that support FGS coding are specified in an amendment of the MPEG-4 standard, *"ISO/IEC 14496-2:1999/FDAM4, "Information technology—coding of audio/visual objects, Part 2: Visual,"* An overview of FGS coding is described by Li in *"Overview of Fine Granularity Scalability in MPEG-4 video standard,"* IEEE Trans. Circuits and Systems for Video Technology, March 2001.

FGS coding is a radical departure from traditional scalable coding. With traditional scalable coding, the content was coded into a base layer bitstream and possibly several enhancement layer bitstreams, where the granularity was only as fine as the number of enhancement layer bitstreams that were formed. The resulting rate-distortion curve resembles a step-like function.

In contrast, FGS coding provides an enhancement layer bitstream that is continually scalable. Providing a continuous scalable enhancement layer bitstream is accomplished by a bit-plane coding method that uses discrete cosine transform (DCT) coefficients. Bit-plane coding allows the enhancement layer bitstream to be truncated at any point. In that way, the quality of the reconstructed video is proportional to the number of bits of the enhancement layer bitstream that are decoded.

FIG. 3 shows a conventional FGS encoder 300. An input video 301 is provided to a typical base layer encoder 310. The base layer encoder includes DCT 311, Quantization (Q) 312, motion compensation (MC) 318, inverse quantization ($Q^{-1}$) 313, inverse DCT (IDCT) 314, motion estimation 317, clipping 315, frame memory 316, and variable length coder (VLC) 319 components. The output of the base layer encoder 310 is a base layer bitstream 302 having some predetermined minimum constant bit-rate. Typically, the CBR is very low, for example, 20 Kbps or less. Thus, the base layer bitstream can be transmitted over high and low bandwidth channels.

The enhancement layer bitstream is generated by subtracting 321 reconstructed frames of the base layer bitstream 302 from the input video 301. This yields an FGS residual signal 322 in the spatial domain. Enhancement layer encoding is then applied to the residual signal 322. The enhancement encoding includes a DCT 330, followed by bit-plane shifting 340, a maximum operation 350, and bit-plane VLC coding 360 to produce the enhancement-layer bitstream 303.

FIG. 4 shows a FGS decoder 400 that can be applied to base layer bitstream 302 and the enhancement layer bitstream 303 to produce reconstructed a base layer video 491 and a reconstructed enhancement layer video 492. The decoder 400 includes a variable length decoder (VLD) 410, inverse quantizer 415, inverse DCT 420, motion compensation 425, frame memory 430, and clipping 435 components. A FGS residual signal 456 is reconstructed by passing the enhancement-layer bitstream 303 through bit-plane VLD 445, bit-plane shift 450 and IDCT 455 components. The FGS residual signal 456 can then be added 457 to the reconstructed base layer signal 436 to yield the enhancement video 492. The combined signal is clipped 460 to ensure that the signal is bounded, i.e., 8-bit pixels values must be in the range [0, 255].

A selective enhancement method to control the bit-plane shifting in the enhancement layer of the FGS coded video bitstream was described in U.S. Pat. No. 6,263,022, "System and method for fine granular scalable video with selective quality enhancement," issued on Jul. 17, 2001 to Chen, et al. There, the quantization parameter used for coding the base layer video also determined the corresponding shifting factor. The bit-planes associated with macroblocks that were deemed more visually important were shifted higher.

A key point to note is that the bit rate of the base layer bitstream is some predetermined minimum. The enhancement layer bitstream covered the range rates and distortions from the minimum to near lossless reconstruction. Also, after the enhancement layer bitstream has been generated, it could be stored and re-used many times. According to e.g., network characteristics, an appropriate number of bits can be allocated to a frame and transmitted over the network, taking into consideration current network conditions. It is important to note however that there is no quantization parameter to adjust in that scheme.

The standard does not specify how rate allocation, or equivalently, the truncation of bits on a per frame basis is to be done. The standard only specifies how the scalable bitstream is decoded. Additionally, traditional methods that have been used to model the rate-distortion (R-D) characteristics, e.g., based on quantization parameters, no longer hold with a bit-plane coding scheme used by the FGS coding. As a result the quality of the reconstructed video can vary noticeably.

Because differential sensitivity is key to our human visual perception, it is important to minimize the variation in perceived quality rather than overall distortion. Optimal rate allocation can be done by minimizing a cost for an exponential R-D model. This leads to constant quality among frames, see Wang, et al., "*A new rate allocation scheme for progressive fine granular scalable coding,*" Proc. International Symposium on Circuits and Systems, 2001. However, this prior art model-based approach does not work well on low bit-rate signals.

Therefore, there is a need for a scalable coder that can provide an output bitstream that has a constant quality. Furthermore, it is desired to provided techniques that can measure R-D characteristic in a bit-plane coded bitstream so that rates can be adjusted to meet quality requirements in real-time.

SUMMARY OF THE INVENTION

The invention provides a method for coding an output bitstream of an input video so the decoded output bitstream has a constant perceived quality. A base layer bitstream having a constant bit-rate is generated from the input video, and an input enhancement layer bitstream is generated from a difference between the input video and the base layer bitstream. Alternatively, the base and input enhancements layer bitstreams are pre-stored.

Rate and distortion characteristics are extracted from the base layer bitstream and the input enhancement layer bitstream, and an output enhancement layer bitstream having a variable bit-rate is generated from the input enhancement layer bitstream according to the rate and distortion characteristics. The base layer bitstream and the output enhancement layer bitstream, in combination, form an output bitstream having a variable bit-rate and a constant distortion.

DETAILED DESCRIPTION OF PREFERRED EMBODIMENTS

System Structure

Figure 5:
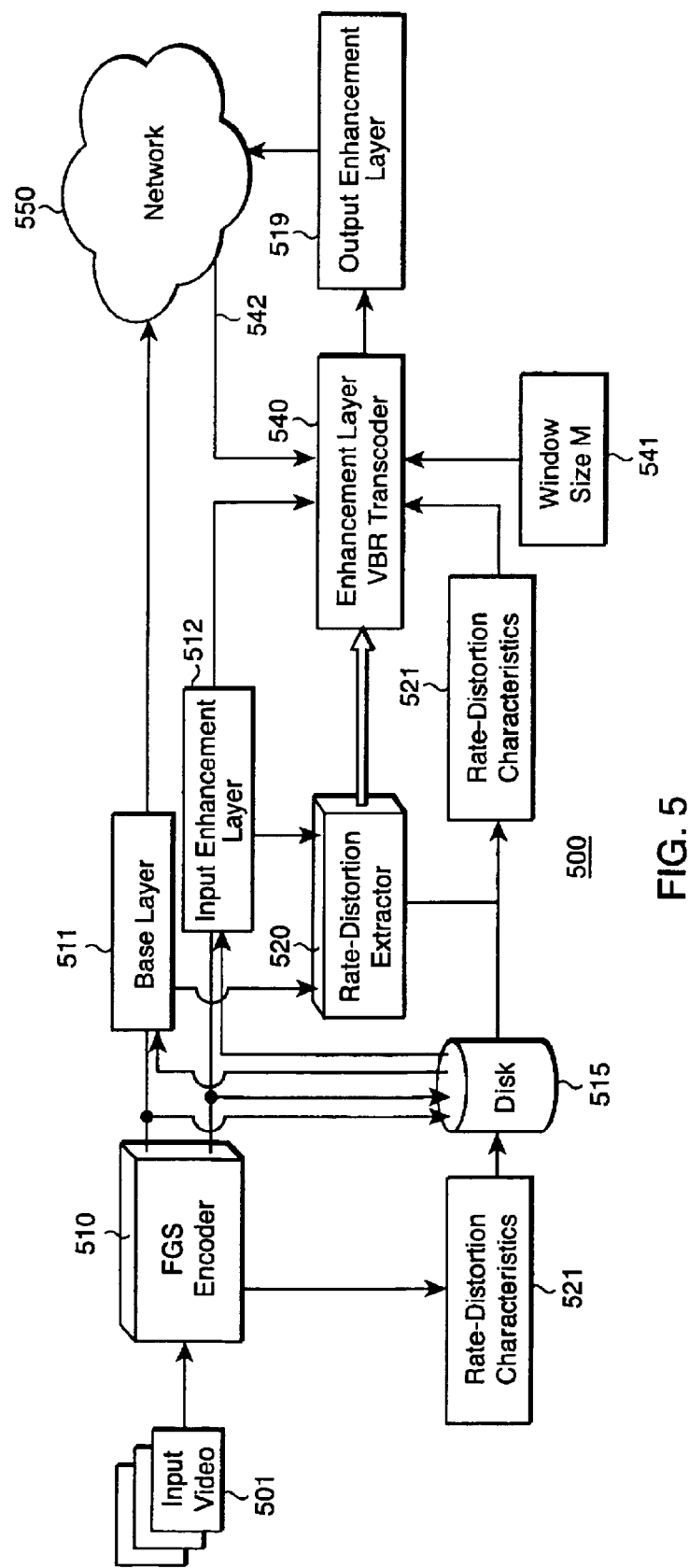
FIG. 5 is a block diagram of a constant quality, multiple-layer VBR encoder according to the invention.

FIG. 5 shows a video encoder 500 according to our invention. The encoder 500 takes as input a source video 501, and produces as output a bitstream composed of base and enhancement layer bitstreams. As an advantage, the combined base and enhancement layer bitstreams enable reconstruction of a video having a constant perceived quality.

The video coder 500 according to our invention includes a fine granular scalable encoder 510 coupled to a rate-distortion extractor 520 and enhancement-layer VBR transcoder 540.

System Operation

The FGS encoder 510 generates the base layer bitstream 511 and an input enhancement layer bitstream 512. The base layer bitstream 511 has a predetermined minimum bit-rate and corresponding distortion. The input enhancement layer bitstream 512 is generated from a difference between the input video 501 and the base layer bitstream 511 using bit-plane encoding, with partial or full decoding of the base layer bitstream 511.

The rate-distortion extractor 520 samples the base and enhancement layer bitstreams to determine rate-distortion (R-D) characteristics 521. Specifically, a set of R-D samples are measured, as described in further detail below. The samples are linearly interpolated to estimate a curve that correctly models the R-D characteristics of the base and input enhancement layer bitstreams.

The enhancement layer VBR transcoder 540 generates an output enhancement layer bitstream 519 from the input enhancement layer bitstream 512 according to the rate and distortion characteristics 521 using a sliding window 541 and available network bandwidth 542. As described below, the size (M) of the window 541 can be fixed or adapted to the video complexity and network conditions.

The base layer bitstream 511 and the output enhancement layer bitstream 519, in combination, can then be stored on a disk for later asynchronous transmission, or the two bitstreams can be transmitted through a network 550 synchronously as they are transcoded. In either case, reconstruction of the bitstreams 511 and 519 produces a video with minimal variation in distortion. Thus, our method effectively maintains a constant perceived quality in the reconstructed video.

Alternatively, the base layer bitstream 511 and the input enhancement layer bitstream 512 are generated in advance by the FGS encoder 511 and pre-stored in a storage unit 515. The FGS encoder 510 can also pre-generate the rate-distortion characteristics 521 while producing the base and input enhancement layer bitstreams 511–512 during this pre-transcoding stage. These can also be stored in the storage unit 515 along with the associated base layer bitstream 511 and input enhancement layer bitstream 512. Then, the rate-distortion extractor 520 is by-passed, and the enhancement layer VBR transcoder 540 operates synchronously in real-time, as described above.

Optimal Rate Allocation on a FGS bitstream

Previous methods for optimal rate allocation have provided solutions for minimizing the overall distortion (D), subject to rate (R) constraints. The most common approach minimizes overall distortion by using a Lagrange multiplier λ. Therefore, we also minimize a cost function J(λ), $$J(\lambda) = \sum_{i=0}^{N-1} D_i(R_i) + \lambda \sum_{i=0}^{N-1} R_i \text{ subject to } \sum_{i=0}^{N-1} R_i \leq R_{budget}, \quad (1)$$

where N is the number of frames in the sequence.

Solving equation (1) directly may lead to negative rate allocation under low bit-rate conditions, i.e., when a rate budget $R_{budget}$ is small, as in a scaleable bitstream. Because this is not practical, the well known Karush-Kuhn-Tucker (KKT) constraints are applied. For example, given the well known model, $D(R)=a\sigma^2 2^{-2R}$, the solution is, $$R_i = \left(-\frac{1}{2}\log_2 \frac{\lambda}{2a\sigma_i^2}\right)^+ \qquad (2)$$

where $(x)^+$ denotes the positive part of x and $$\sum_i \left(-\frac{1}{2}\log_2 \frac{\lambda}{2a\sigma_i^2}\right)^+ = R_{budget}.$$

Rate-Distortion Extractor

Our R-D extractor 520 operates on the base layer bitstream 511 and the input enhancement layer bitstream 512 to provide the R-D characteristics 521. Our method overcomes problems caused by inaccuracy of prior art closed form models at low bit-rates.

The performance of model based methods for rate allocation depends heavily on the accuracy of the selected model. Prior art exponential models do not accurately model rate-distortion properties at low bit-rates, as can be present in the FGS bitstreams 511–512, see Wang above. This is consistent with the classic theory on this subject, see Jayant and Noll, *Digital Coding of Waveforms*, Prentice Hall, 1984.

To overcome the prior art problems, our R-D characteristics 521 estimate the complete R-D relationship in the FGS bitstreams. We use linear interpolation between R-D samples to estimate a curve that correctly models the R-D relationship. Because the actual R-D curve is typically smooth, only a small number of R-D samples are needed to accurately estimate the R-D curve. In practice, we have found that two R-D samples are sufficient to approximate the R-D relationship of each bit-plane.

As an advantage, our R-D extractor 520 can determine the R-D characteristics 521 not only for stored bitstreams, but also for real-time operation on a streaming video. In addition, our R-D characteristics can be obtained either in the frequency domain using DCT coefficients or in the spatial domain because the variance of signals, in general, are invariant of the DCT. We can extract R-D characteristics from the base layer bitstream 511 using conventional techniques, however we also extract R-D characteristics from the input enhancement layer bitstream 512.

Spatial R-D Extraction

Figure 1:
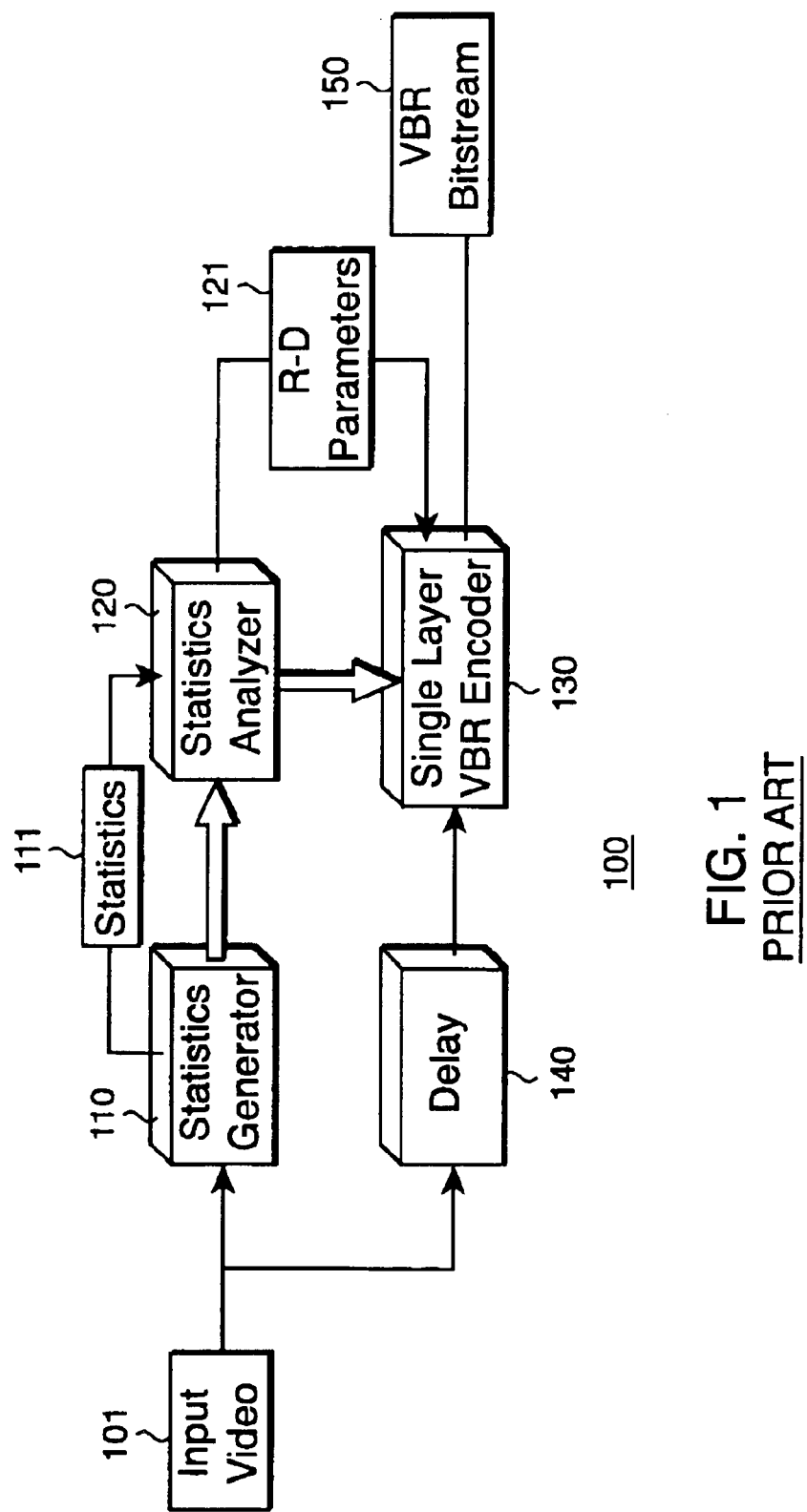
FIG. 1 is a block diagram of a prior art single-layer VBR encoder.
Figure 2:
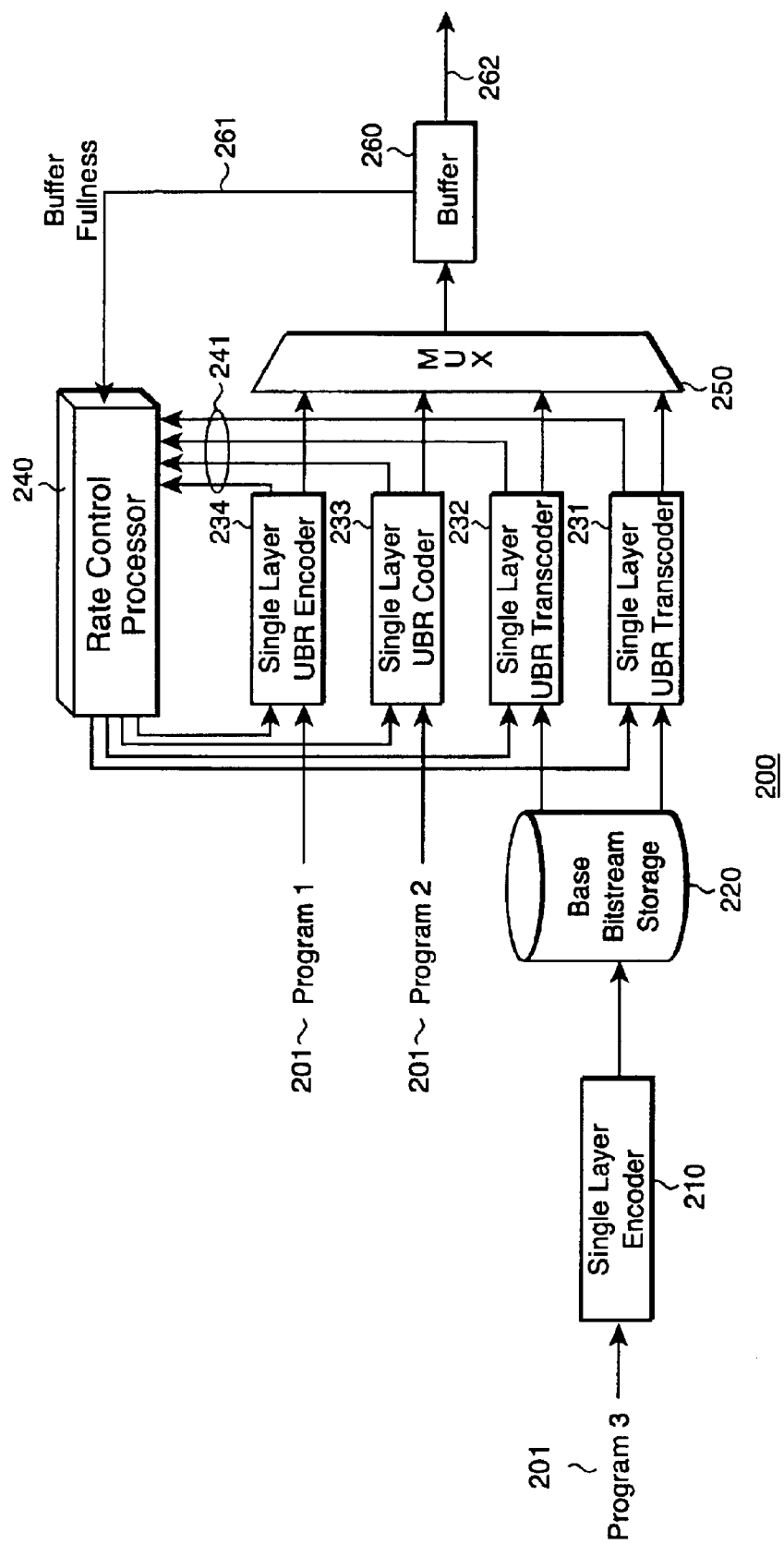
FIG. 2 is a block diagram of a prior art multiple single-layer VBR encoders with statistical multiplexed output.
Figure 3:
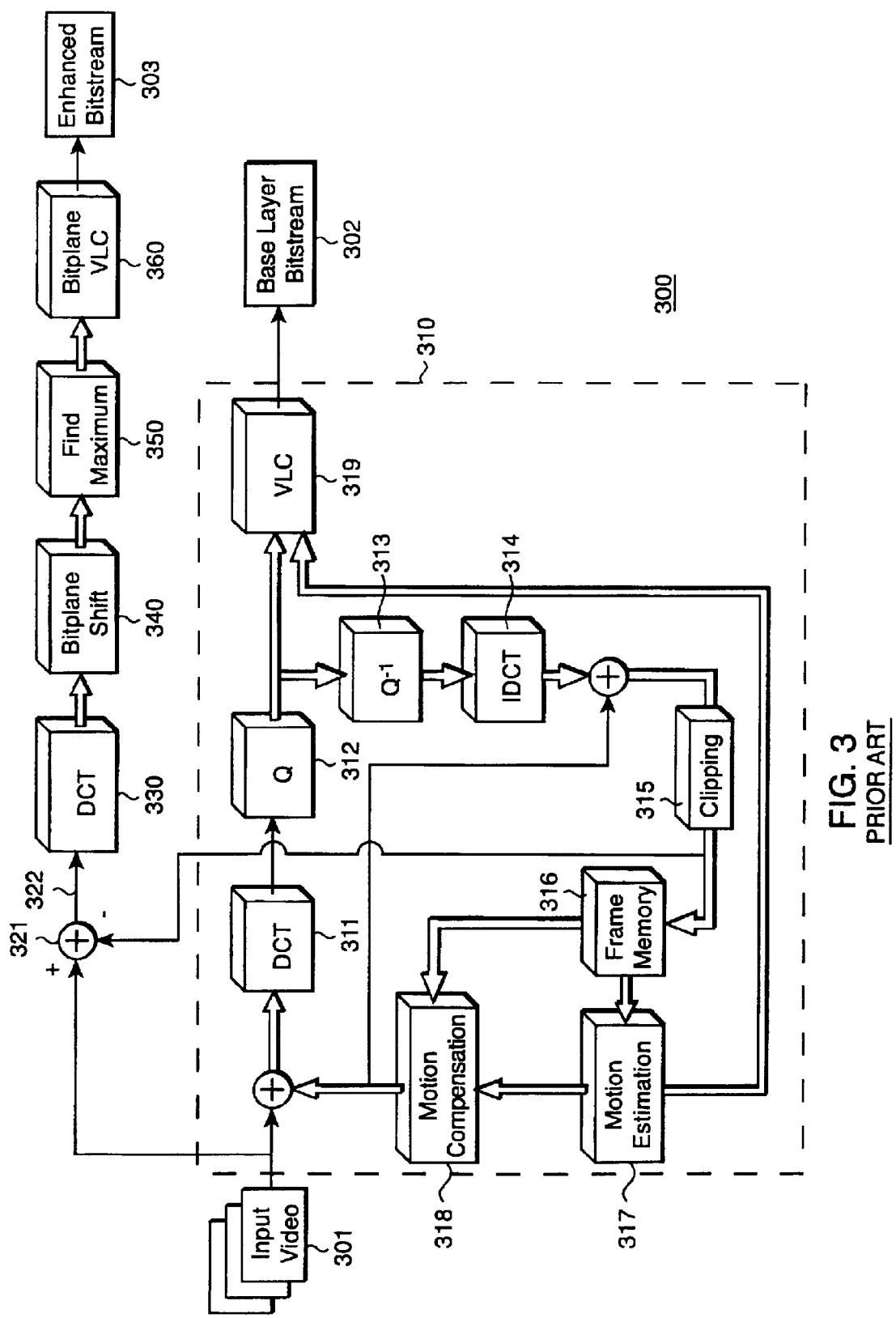
FIG. 3 is a block diagram of a prior art fine granular scalable (FGS) encoder.
Figure 4:
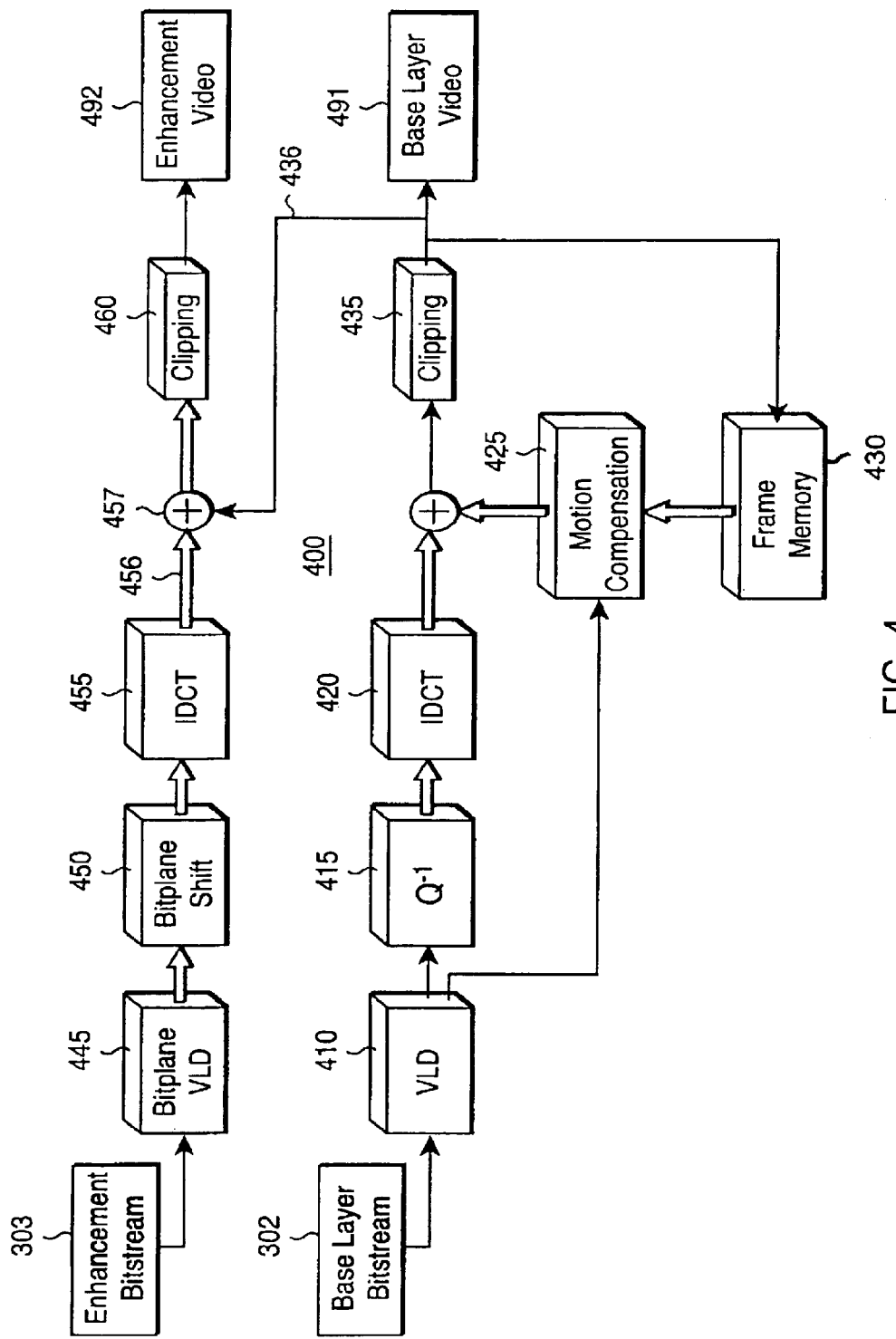
FIG. 4 is a block diagram of a prior art FGS decoder.
Figure 6A:
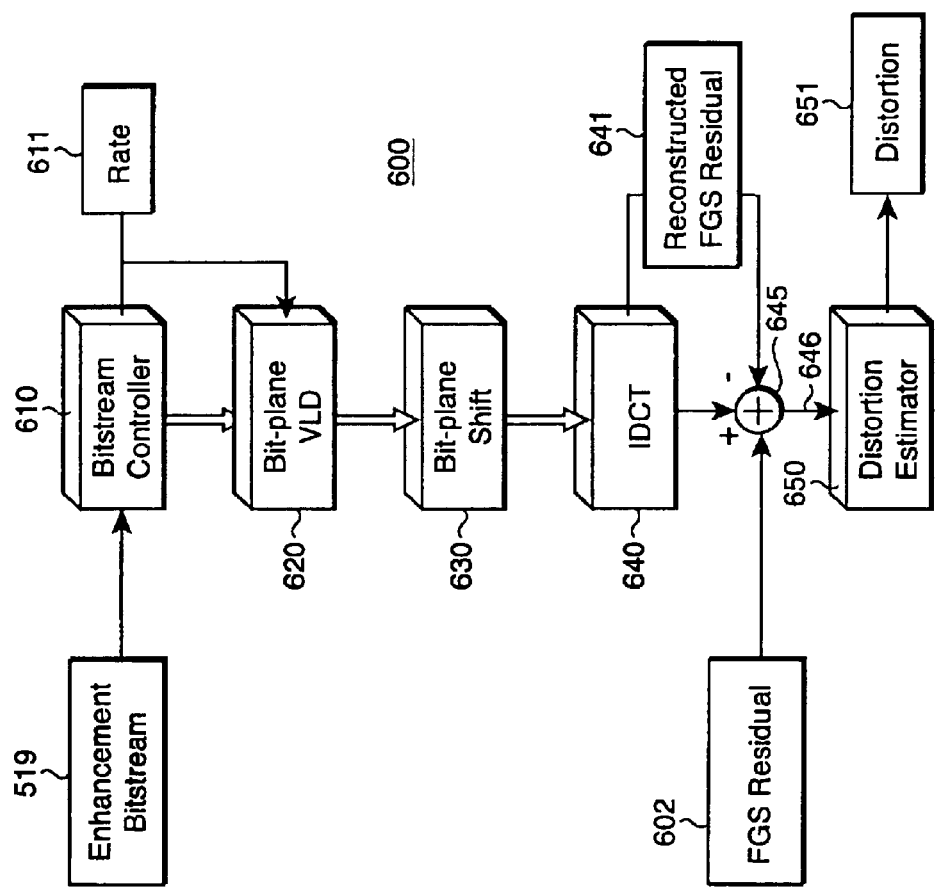
FIG. 6a is a block diagram of a rate-distortion extractor for FGS enhancement layer encoding in the spatial domain.

FIG. 6a is a block diagram of a R-D extractor 600 that measures R-D distortion samples in the spatial domain. The enhancement layer bitstream 519 is first passed through a bitstream controller 610 to measure rate samples 611. The rate samples can be linearly spaced, or selected according to a pre-determined function. The rate samples are recorded as a first part of each R-D sample pair $\{R, D\}$. Based on each rate sample, a specified number of bits are used to reconstruct a FGS residual signal 641 using a bit-plane VLD 620, bit-plane shift 630 and IDCT 640. The reconstructed FGS residual 641 is subtracted 645 from the original FGS residual 602 (see signal 322 in FIG. 3) to yield an error signal 646. The distortion 651 is then estimated 650 based on the spatial domain error 646 to yield a distortion sample 651, which form the second part of each R-D pair $\{R, D\}$. This process is repeated for multiple rate sample points to yield a set of R-D pairs.

Frequency Extraction

Figure 6B:
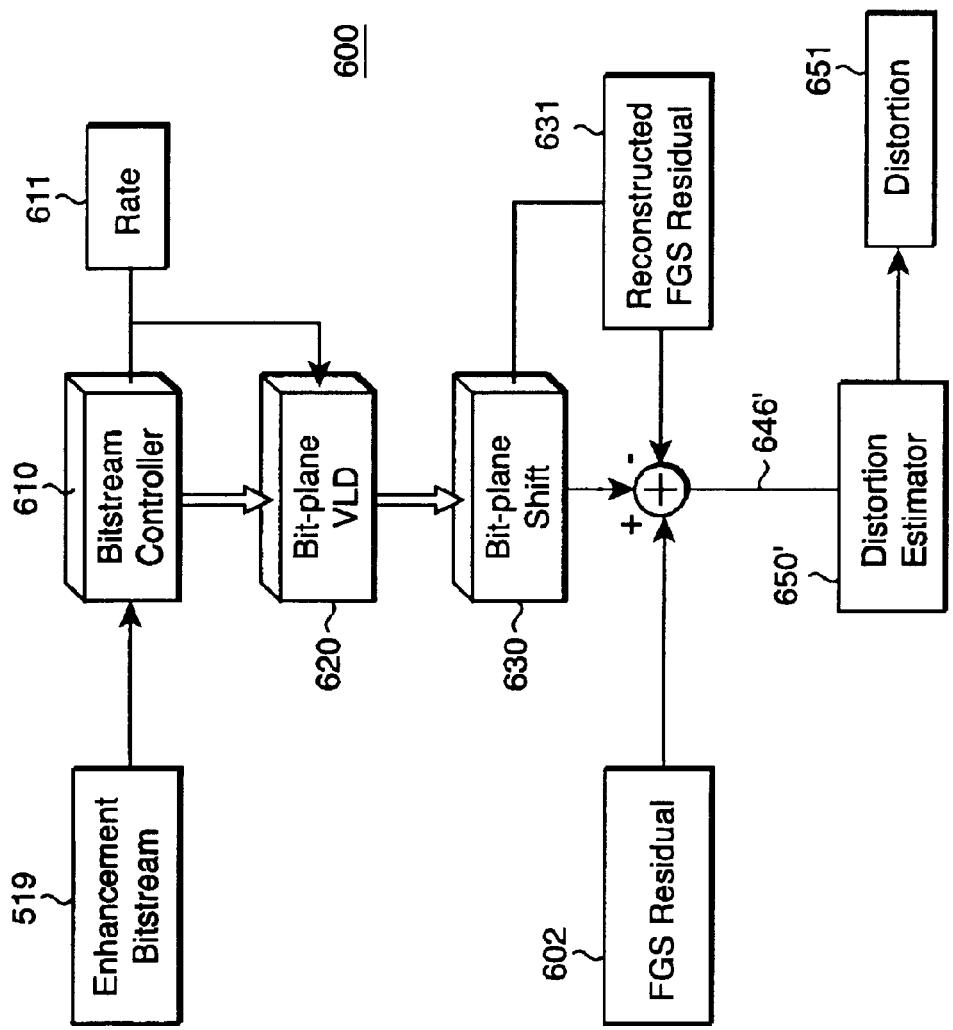
FIG. 6b is a block diagram of a rate-distortion extractor for FGS enhancement layer bitstreams in the frequency domain.

FIG. 6b is a block diagram of a R-D extractor 600 that measures the R-D samples in the DCT domain. The process is similar to the process described in FIG. 6a, except that no IDCT 640 is taken to yield the reconstructed FGS residual 631 in the DCT domain. This reconstructed FGS is subtracted 645 from the original FGS residual 602 (see signal 322 in FIG. 3) to yield an error signal 646'. The distortion 651 is then estimated 650' based on the frequency domain error 646' to yield the distortion sample 651, which form the second part of each R-D pair $\{R, D\}$. This process is repeated for multiple rate sample points to yield a set of R-D pairs.

In contrast to the prior art, where R-D samples are only obtained from the base layer bitstream, we also extract samples from the bit-plane coded enhancement layer bitstream. The prior art techniques require that the input video be coded with various quantizers. That is computationally demanding and not suitable for real-time applications, as desired here. Our method enables real-time R-D sample extraction from the bit-plane coded enhancement layer bitstream.

Bit-Rate Allocation for a Single FGS Video with Constant Distortion

The R-D characteristics 521 that we extract are sufficient for optimal rate allocation in the VBR transcoder 540. Given this information, we again minimize the cost function of equation (1), but this time constraining the distortion. In prior art methods, an exhaustive search was typically used to find the optimal solution to equation (1). In contrast, we provide a practical rate allocation method.

Based on a suitable initial estimation of the constant distortion, the optimal solution can be obtained in one pass. A sliding window technique is used to adapt to variations in the a network over time.

For an initial estimate of the constant distortion D, we consider two adjacent R-D samples $\{R_{m_i}, D_{m_i}\}$ and $\{R_{n_i}, D_{n_i}\}$, such that $D_{m_i} \geq D \geq D_{n_i}$ and $R_{m_i} \leq R_i \leq R_{n_i}$, where $R_i$ is the optimal rate to be allocated to frame i to achieve the constant distortion D. We determine the initial estimation of D by using an average of the measured distortion samples, i.e., $$D = \frac{1}{N}\sum_{i=0}^{N-1} D_i,$$

where $D_i$ is the distortion associated with constant bit-allocation. Using the rate associated with constant bit-allocation provides a computationally efficient way to approximate the neighborhood where an optimal rate is located.

In practice, the available bandwidth for each frame varies due to varying network conditions. Therefore, we use a bit-rate allocation scheme that uses a sliding window. A rate budget $W_a$ for a window of M frames beginning with a frame at time a is:

$$W_a = \begin{cases} M \cdot R_{budget}/F_s; & a = 0 \\ W_{a-1} - R_{a-1} + R_{budget}/F_s; & 1 \leq a \leq M-1 \end{cases}, \qquad (3)$$

where $R_{budget}$ is the available bandwidth at time a, and $F_s$ is the frame-rate of the input sequence. The rate budget is determined for each frame in the window, and a rate allocation for the current frame is based on a set of equations given below, $$\begin{cases} \sum_{i=a}^{a+M-1} R_i = W_a \\ D_{m_i} - (R_i - R_{m_i}) \frac{\Delta D_i}{\Delta R_i} = D_{m_{i+1}} - (R_{i+1} - R_{m_{i+1}}) \frac{\Delta D_{i+1}}{\Delta R_{i+1}}; a \leq i \leq a + M - 2 \end{cases} \quad (4)$$

where $\Delta R_i = R_{n_i} - R_{m_i}$ and $\Delta D_i = D_{m_i} - D_{n_i}$ represent the difference in rate and distortion at the two adjacent R-D samples, respectively. This yields a set of M equations with M unknowns that can be solved using known methods.

If the solution to the above equations is negative for a frame i, we let $R_i = 0$ and re-compute the solution. Because the rate allocated to each window is changing on a per frame basis, we only solve the above equations for the current frame $R_i$.

The computational complexity of our method is substantially lower than the exhaustive search done in the prior art. However, we further reduce the computational cost by determining the rate for every set of M frames, rather than on a per frame basis. In this way, the sliding window moves by M frames in each step, instead of one frame at a time. In each step, the rate allocated to each frame in the window is the rate for the set of frames. This improved method works best for a network with slowly varying conditions. Also, variation in the distortion can be further reduced by increasing the size M of the sliding window, we find that a window of size in the range of about 20 frames works well. However, the value of M can be chosen adaptively based on the amount of variation in the complexity of the video and/or the dynamics of the network.

With a larger window size, the R-D information of more frames have to be known before the transmission. If the R-D information has been obtained off-line and stored, the rate control processor 720 has instant access to this data. Because the computation complexity of our method is very low, O(M), the computation delay can effectively be ignored. Under stable network conditions, it is desirable to select a larger window to smooth the fluctuations caused by varying complexity of the video.

On the other hand, if the network condition is unstable, we prefer smoothness at the expense of an initial delay. In this case, a buffer can be used to temporarily store the current M frames. Then, bit-rate allocation can be adjusted among the current frames. In a real application scenario, the window size can adaptively be determined based on a maximum variation among frames, the sensitivity to the initial delay, and the target smoothness. The optimal solution is balance of these factors.

Bit-Rate Allocation for Multiple FGS Videos with Constant Distortion

In modern communication systems, transmitters of video streams are usually connected to receivers by a wide-band network having high bandwidth CBR channels, e.g., a coaxial or fiber-optic cable. When multiple videos are transmitted in this type of a network, the individual bitstreams are multiplexed into a single channel having a constant aggregate bit-rate.

To efficiently utilize the high bandwidth channel while maintaining a constant perceived quality for each of the multiple videos, each video is VBR coded as described above. Furthermore, a sum of the multiple VBR output bitstreams, at any time, is less than or equal to a constant aggregate bit-rate. In fact, to fully utilize the bandwidth, the sum is as close as possible to the aggregate CBR of the channel.

Our method minimizes not only the variation in distortion in each video, but also the overall distortion of all of the videos, while at the same time maximizing channel utilization.

Figure 7:
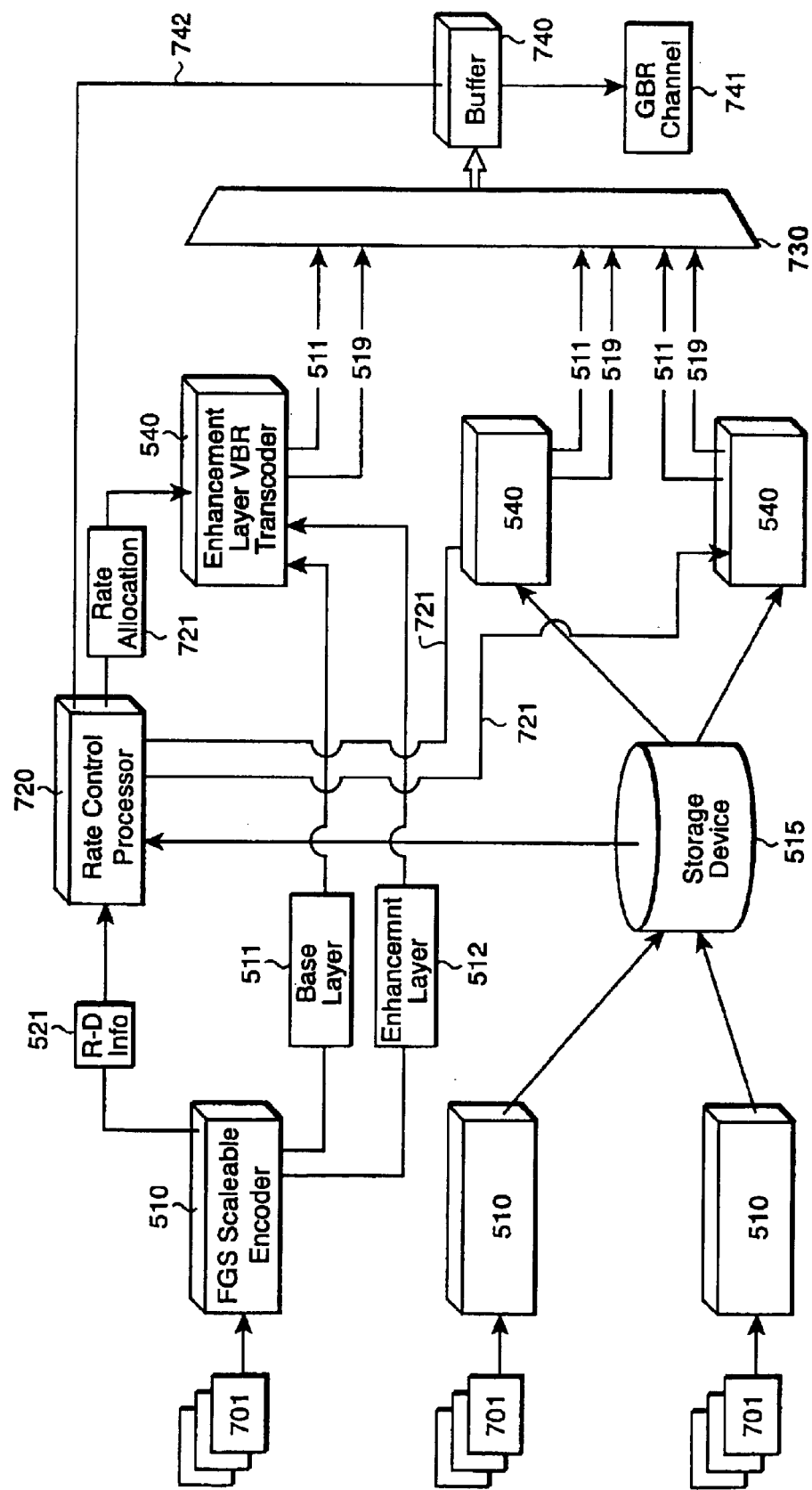
FIG. 7 is a block diagram of multiple FGS and VBR encoders with statistical multiplexed output.

FIG. 7 shows a block diagram of a multi-video FGS statistical encoder 700 according to the invention. Concurrent inputs to the encoder 700 are multiple videos 701, and output is multiplexed VBR bitstreams on a CBR channel 741 while meeting the above conditions.

First, each input video 701 is individually encoded 510 into VBR FGS bitstreams 511 and 512 as described above. Corresponding R-D characteristics 521 can be measured. For asynchronous, i.e., non real-time, applications, the output is stored in the storage unit 515. R-D characteristic 521 are sent to a rate control processor 720. The rate control processor determines a rate allocation 721 for each enhancement layer VBR transcoder 540. For synchronous, i.e., real-time, applications, the storage 515 is bypassed, and base and input enhancement layer bitstreams are passed directly to the enhancement layer VBR transcoders 540.

The output bitstreams from the transcoders 540 are multiplexed 730, buffered 740 and synchronously transmitted over the CBR channel 741, or stored for later asynchronous transmission. The buffer provides a feedback signal 742 to the rate control processor 720 on the buffer fullness.

Rate Control Processor

The rate control processor 700 extends the formulation described above for a single video to multiple videos. Similar assumptions are made. Namely, the minimum distortion variance across the multiple videos leads to the minimum overall distortion. The rate budget $W_b$ for a two-dimensional window of M frames and K sources beginning with frame b is $$W_b = \begin{cases} M \cdot R_{budget} / F_s; b = 0 \\ W_{b-1} - \sum_{j=0}^{K-1} R_{j,b-1} + R_{budget} / F_s; 1 \leq b \leq M - 1 \end{cases} \quad (5)$$

where $R_{budget}$ is now the total bit-budget for K sources, and $R_{j,i}$ is the number of bits used for video j at frame i. The rate budge is determined for each frame in the window for each video, and a rate allocation for the current frame is based on the set of equations $$\begin{cases} \sum_{j=0}^{K-1}\sum_{i=b}^{b+M-1} R_{j,i} = W_b & (6) \\ D_{m_{j,i}} - (R_{j,i} - R_{m_{j,i}})\dfrac{\Delta D_{j,i}}{\Delta R_{j,i}} = D_{m_{j+1,i}} - (R_{j+1,i} - R_{m_{j+1,i}})\dfrac{\Delta D_{j+1,i}}{\Delta R_{j+1,i}}; & \begin{array}{l} i = b \\ 0 \le j \le K-2 \end{array} \\ D_{m_{j,i}} - (R_{j,i} - R_{m_{j,i}})\dfrac{\Delta D_{j,i}}{\Delta R_{j,i}} = D_{m_{j,i+1}} - (R_{j,i+1} - R_{m_{j,i+1}})\dfrac{\Delta D_{j,i+1}}{\Delta R_{j,i+1}}; & \begin{array}{l} b \le i \le b+M-2 \\ 0 \le j \le K-1 \end{array} \end{cases}$$

where $\Delta R_{j,i} = R_{n_{j,i}} - R_{m_{j,i}}$ and $\Delta D_{j,i} = D_{m_{j,i}} - D_{n_{j,i}}$ represent the difference in rate and distortion at the two adjacent R-D samples from video j, respectively. The above yields a set of M×K equations with M×K unknowns that can be solved for using know methods.

Results and Effect

To validate the effectiveness of our single video methods, we encode the well known "Foreman" video sequence used in the MPEG-4 standard at common-intermediate-format (CIF) resolution using FGS and FGS-Temporal (FGST) coding. The encoding frame rate for the base layer bitstream is fixed at 10 fps for both the FGS and FGST coding. We test three rate allocation methods: a uniform bit-allocation method, a Gaussian model based optimal bit-allocation method, and the method according to the invention.

Figure 8A:
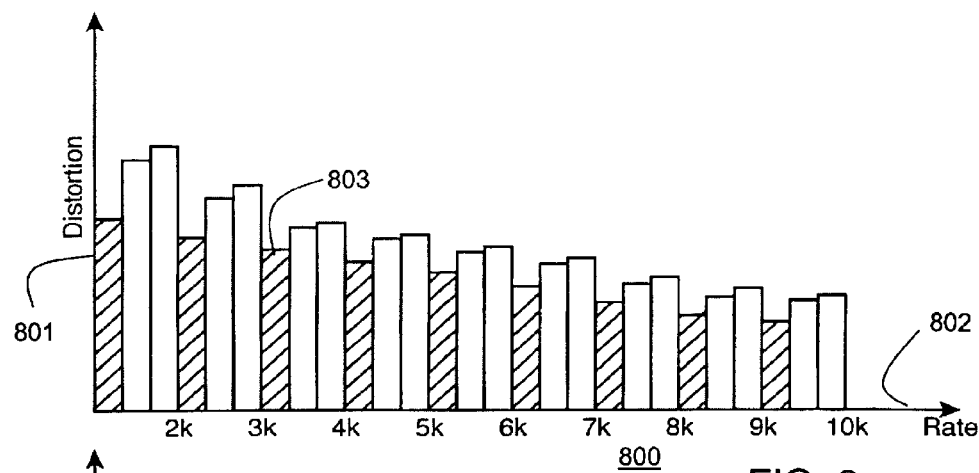
FIGS. 8a–c are graphs comparing multi-layer encoding methods.
Figure 8B:
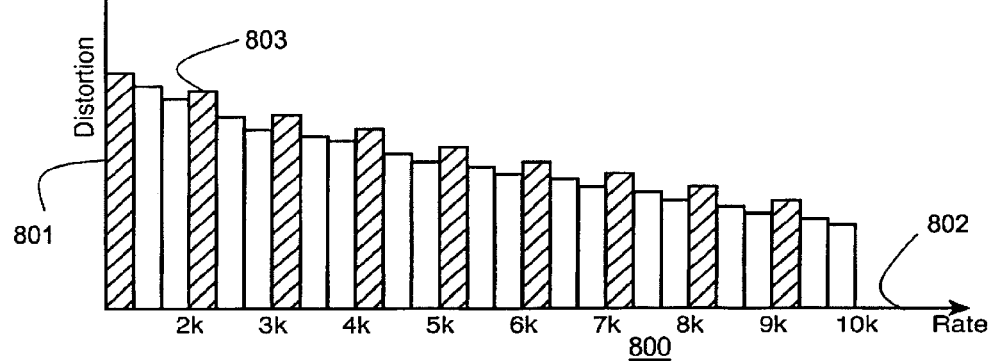
Figure 8C:
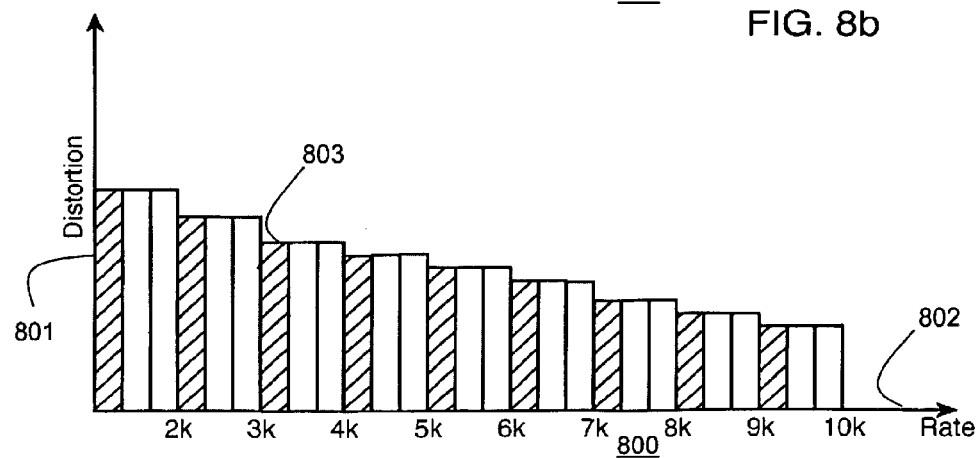

FIGS. 8a–c respectively show the resulting distortions 801 of each frame corresponding to different rates 802, where each group of three frames 800 are compared and the cross-hatched bars 803 denote the first frame of the group of three frames. It is evident from these graphs that only the method according to the invention, as shown in FIG. 8c achieves constant distortion across frames for a wide range of bit-rates.

Figure 9A:
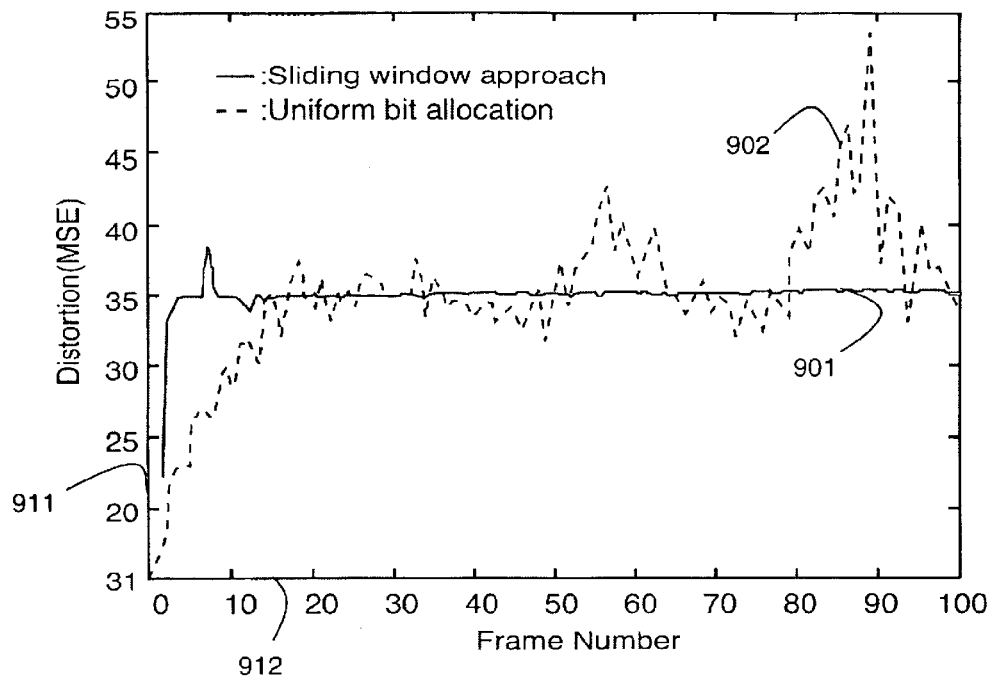
FIG. 9a is a graph of constant quality on a frame basis using a first set of coding parameters according to the invention in comparison to prior art methods.
Figure 9B:
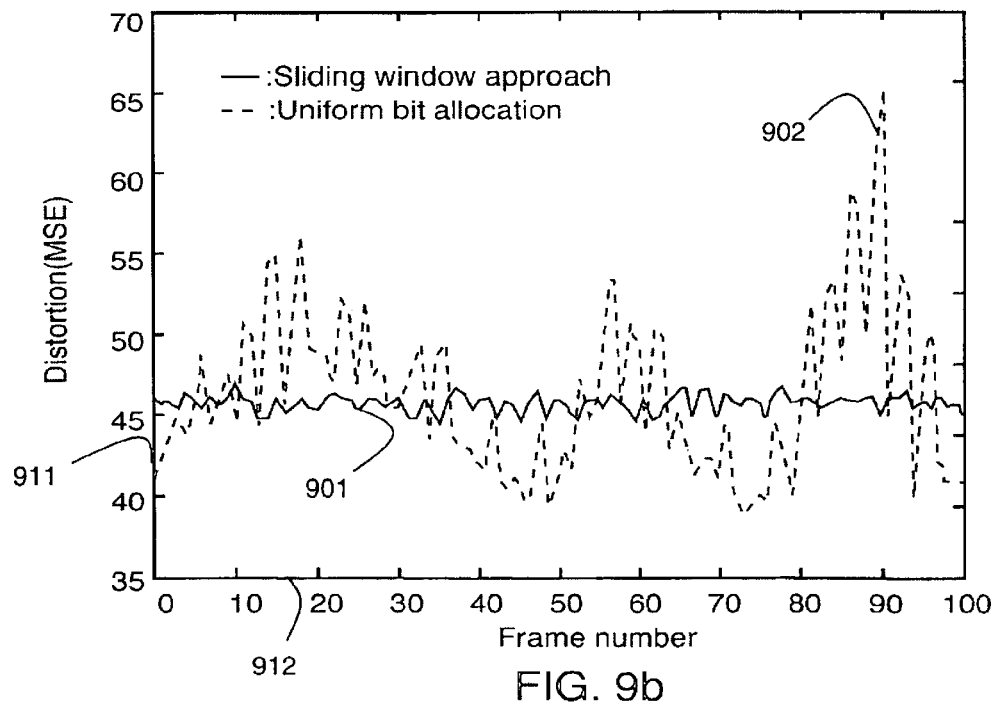
FIG. 9b is a graph plot that illustrates constant quality on a frame basis using a second set of coding parameters according to the invention in comparison to prior art methods.

FIGS. 9a and 9b compare our sliding window approach 901 to uniform bit-allocation 902 of the prior art. The base layer bitstream is encoded with two sets of quantization parameters and the enhancement layer bitstream is allocated a rate of 75 kBytes per second, which allows 2.5 KBytes per FGS-VOP with uniform bit-allocation. The distortion 911 for each method is plotted over 100 consecutive frames 912.

The results clearly indicate that the distortion becomes constant after only a few frames with the our method 901, while the distortion by the uniform bit-allocation method 902 contains significant variation over the entire sequence of one-hundred frames. This is significant for many videos where the length of "shots" typical is in the range of one to ten seconds, i.e., thirty to three-hundred frames.

Moreover, the average mean square error (MSE) of the distortion is decreased from 35.14 to 34.91 in FIG. 9a and decreased from 46.31 to 45.50 in FIG. 9b.

Figure 10:
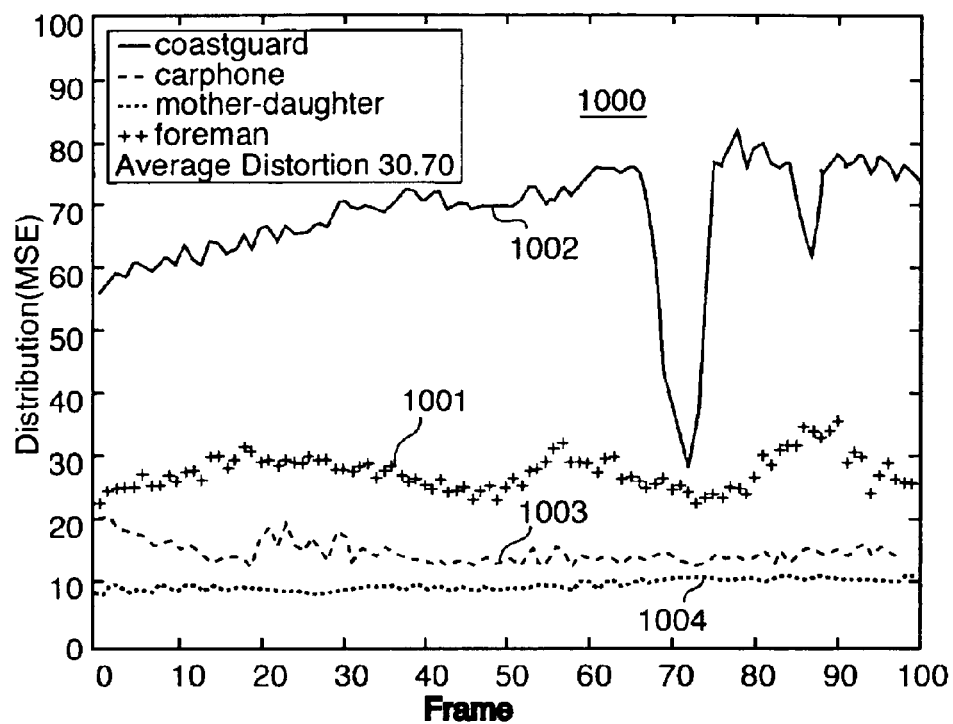
FIG. 10 is a graph illustrating variable quality on a per frame basis of statistically multiplexed output bitstreams using a prior art uniform bit allocation method.
Figure 11:
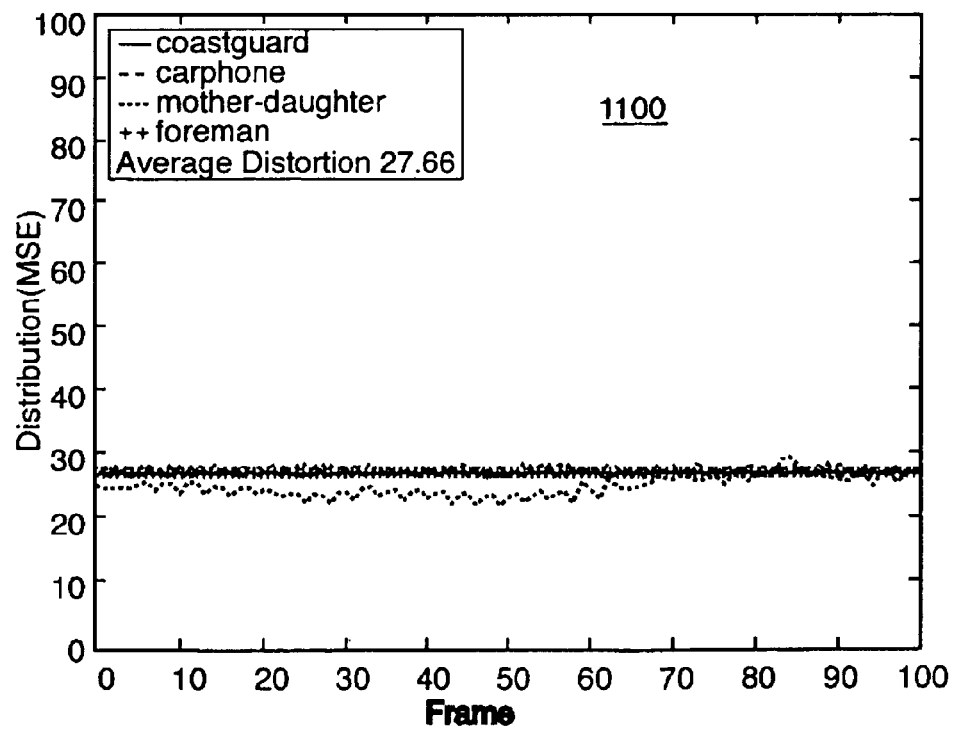
FIG. 11 is a graph illustrating constant quality on a per frame basis of statistically multiplexed output bitstreams using bit allocation methods according to the invention.

FIGS. 10 and 11 compare prior art uniform bit-allocation 1000 to our sliding window approach 1100 to validate the effectiveness of our multiple video methods. We encode the Foreman 1001, Coastguard 1002, Carphone 1003 and Mobile 1004 sequences at CIF resolution using FGS and FGST coding. The encoding frame rate for the base layer bitstream is fixed at 10 fps for both FGS and FGST coding. The enhancement layer bitstream is allocated a rate of 1320 kbps, which allows 5.5 kBytes per FGS-VOP with uniform bit allocation. The distortion for each method is plotted over 100 consecutive frames.

The results 1000 using prior art uniform bit allocation indicate that the sequences have significant quality difference. This is due to the different complexity associated with each sequences. Besides the inter-difference among the sequences, intra-fluctuations among the frames within the same sequence cannot be avoided by uniform rate allocation. On the other hand, almost constant quality results 1100 are obtained with the method according to the invention. The average distortion is decreased by about 10% from 30.70 to 27.66.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating an output bitstream representing an input video having measurable rate and distortion characteristics, the output bitstream to be reconstructed as a constant quality output video, comprising:

providing a base layer bitstream and an input enhancement layer bitstream representing the input video;

generating a output enhancement layer bitstream having a variable bit-rate from the input enhancement layer bitstream according to the rate and distortion characteristics;

combining the base layer bitstream with the output enhancement layer bitstream to form the output bitstream having a variable bit-rate and a constant distortion;

measuring the rate and distortion characteristics as sample pairs from the base layer bitstream and the input enhancement layer bitstream comparing two adjacent rate and distortion sample pairs;

averaging the measured distortion between the adjacent rate and distortion sample pairs to estimate a constant distortion value;

determining maximum rate available to maintain constant distortion over available bandwidth of a channel; and adapting to variations in the rate samples over time using a sliding window of M frames.

2. The method of claim 1 further comprising:

generating the base layer bitstream from the input video at a constant bit-rate in fine grain scalable encoder;

generating the input enhancement layer bitstream from a difference between the input video an the base layer bitstream in the fine grain scalable encoder; and storing the se layer bitstream and the input enhancement layer bitstream in a first storage unit.

3. The method of claim 1 further comprising:

reconstructing the output video from the base layer bitstream and the output enhancement layer bitstream in a fine grain scalable decoder.

4. The method of claim 1 further comprising:

storing the output bitstream in a second storage unit for asynchronous transmission.

5. The method of claim 1 further comprising:

presenting the output bitstream to a network for synchronous transmission.

6. The method of claim 1 further comprising:

decoding the base layer bitstream partially before generating the input enhancement layer bitstream.

7. The method of claim 1 further comprising:
decoding the base layer bitstream fully before generating the input enhancement layer bitstream.

8. The method of claim 1, further comprising:
bit-plane encoding the input enhancement layer bitstream.

9. The method of claim 1 further comprising:
measuring the rate and distortion characteristics from the input video.

10. The method of claim 1 further comprising:
interpolating linearly the measured rate and distortion pairs to estimate a curve that correctly models the rate and distortion characteristics of the base layer bitstream and the input enhancement layer bitstream.

11. The method of claim 1 further comprising:
measuring the rate and distortion characteristics in a frequency domain.

12. The method of claim 11 further comprising:
measuring the rate samples of the input enhancement layer;
recording ea h rate sample as a first part of a rate-distortion sample pair;
reconstructing a fine granular scalable residual signal in the frequency domain using bit-plane variable length decoding and bit-plane shifting on a specified number bits based on each rate sample;
subtracting the reconstructed fine granular scalable residual signal from an original fine granular scalable residual signal to yield an error signal;
estimating a distortion value based upon the error signal to yield a distortion sample as a second part of each rate-distortion sample pair.

13. The method of claim 1 further comprising:
measuring the rate and distortion sample pairs at a frequency less than frame by frame.

14. The method of claim 1 further comprising:
moving the sliding window by a number of frames greater than one in each step.

15. The method of claim 1 further comprising:
measuring the rate and distortion characteristics in the spatial domain.

16. The method of claim 15 further comprising:
reconstructing a fine granular scalable residual signal in the spatial domain using inverse discrete cosine transform on a specified number of bits based on each rate sample.

17. The method of claim 1 wherein the number of frames in the window is adjusted according a complexity of the frames within the window.

18. The method of claim 1 wherein the number of frames in the window is adjusted according to a condition of a network used to transmit the output bitstream.

19. The method of claim 1 wherein the input enhancement layer includes a plurality of bit-planes and further comprising:
approximating each bit-plane with two rate-distortion samples.

20. The method of claim 1 wherein a plurality of concurrent output bitstreams are generated from a plurality of input videos each having corresponding rate distortion characteristics, and further comprising:
providing the base layer bitstream and the corresponding input enhancement layer bitstream representing each input video;
generating the output enhancement layer bitstream having the variable bit-rate from the input enhancement layer bitstream according to the corresponding rate and distortion characteristics;
combining the base layer bitstream with the output enhancement layer bitstream to form the output bitstream having a variable bit-rate and a constant distortion for each input video; and
multiplexing the plurality of output bitstreams such that a sum of the variable bit-rates of the plurality of output bitstream, at any time, is less than or equal to a constant aggregate bit-rate.

21. The method of claim 20 wherein the sum is as close as possible to the aggregate CBR of the channel.

* * * * *